United States Patent [19]

Kupka et al.

[11] 4,079,418
[45] Mar. 14, 1978

[54] POWER SUPPLY UNIT FOR DATA VIEWING DEVICES

[75] Inventors: Detlef Kupka; Heinz Lang, both of Munich, Germany

[73] Assignee: Siemens Aktiengesellschaft, Berlin & Munich, Germany

[21] Appl. No.: 694,718

[22] Filed: Jun. 10, 1976

[30] Foreign Application Priority Data

Jun. 18, 1975 Germany .................. 2527112

[51] Int. Cl.² ............... H04N 5/04; H04N 3/18; H04N 5/44
[52] U.S. Cl. .............................. 358/149; 358/190; 358/194
[58] Field of Search ........... 325/308; 358/86, 149, 358/190, 194; 315/41; 321/2; 178/DIG. 11, DIG. 13

[56] References Cited

U.S. PATENT DOCUMENTS

| 3,432,737 | 3/1969 | Hunter et al. | 321/2 |
| 3,818,128 | 6/1974 | Chambers et al. | 358/190 |
| 3,869,566 | 3/1975 | Smith | 358/190 |
| 3,989,995 | 11/1976 | Peterson | 321/2 |

*Primary Examiner*—Robert L. Griffin
*Assistant Examiner*—Aristotelis M. Psitos
*Attorney, Agent, or Firm*—Hill, Gross, Simpson, Van Santen, Steadman, Chiara & Simpson

[57] ABSTRACT

The invention relates to a power supply unit for data viewing devices, which, from a main alternating voltage produces at least one d.c. voltage for the operation of the data viewing device, where the power supply unit is in the form of a switching power supply unit and contains an oscillator which produces signals which determine the switching frequency of the switching power supply unit and where the data viewing device contains a pulse generator which, in order to produce an image on a screen, produces timing pulses of a given repetition frequency and a given duration.

More particularly, the control stage for a switching power supply unit of a data viewing device having a display screen includes a free-running oscillator whose frequency is synchronized by timing pulses from a pulse generator. These pulses are of a predetermined repetition frequency and a given duration. The oscillator is preferably an astable multivibrator. The output signal of the oscillator is pulse modulated and fed to the base of a switching transistor in the power supply circuit. A separator stage such as an optical coupling element or transformer, is provided in the circuit between the pulse generator and the oscillator. The oscillator may contain an amplifier provided with a positive feedback and a negative feedback and which oscillator has its control input connected to the non-inverting input of the amplifier. The non-inverting input of the amplifier preferably includes a capacitor.

3 Claims, 2 Drawing Figures

POWER SUPPLY UNIT FOR DATA VIEWING DEVICES

BACKGROUND OF THE INVENTION

Power supply units are required in data viewing devices in order to convert the a.c. voltage of supply mains to d.c. voltages suitable for the operation of a data viewing device. It is already known to provide conventional power supply units in data viewing devices, which normally contain a mains transformer, a rectifier circuit and a regulated adjusting element. A power supply unit of this type is described, for example, in the German Published Application No. 12 94 527. This power supply unit contains a mains transformer and on the secondary side a switching regulator is provided in order to stabilize the d.c. voltage emitter to a consumer. The switching frequency of the switching regulator is here determined by timing pulses emitter by the consumer. These power supply units have the disadvantage, however, that the mains transformer is relatively large and heavy, their efficiency is relatively poor, and a high outlay is required for cooling the adjusting element.

When such a power supply unit is employed in data viewing devices, magnetic fields produced as stray fields, in particular by the mains transformer and by chokes in the power supply unit, with a frequency of, e.g., 50 Hz corresponding to the mains frequency are input coupled into the deflecting coil or directly onto the electron beam of a cathode ray tube provided in the data viewing device.

In the event of a slight difference between the image frequency of the data viewing device and the mains frequency, a beat occurs which is superimposed upon the characters on the screen of the cathode ray tube and whose frequency is equal to the difference between the image frequency and the mains frequency. This beat is clearly visible and is disturbing to the observer.

The image frequency is determined by the repetition frequency of timing pulses which are produced in a pulse generator arranged in the data viewing device. The pulse generator contains a quartz crystal which determines the repetition frequency of the timing pulses. For example, for the formation of the characters and the construction of the image on the screen, the quartz crystal emits timing pulses having a duration of 7.9 μsec. If, for example, 25 lines each comprising 80 characters are represented on the screen, and 16 timing pulses are in each case required for the return of the electron beam, there is an image frequency of 52.9 Hz and the beat has a frequency of 2.9 Hz.

In the event of an image frequency which is considerably greater than the mains frequency and, for example, is 300 Hz, the super position of the magnetic fields results in a haziness of the electron beam on the screen which is likewise disturbing. In both cases, although the super positions can be reduced by screening the cathode ray tube and/or the mains transformer and the chokes, they cannot be eliminated.

It is also known to use switching power supply units. These switching power supply units are already generally known and described for example, in a publication by R. Ranfft: "Schaltnetzteile mit schnellen Transistoren hoher Sperrspannung" in "Valve-Berichte" Edition 18, Vol. ½, pages 143 to 153 and in a "Valvo-Brief" of 19.9.1974. In the switching power supply units, the mains voltage is first rectified and filtered. The d.c. voltage obtained in this way is conducted to a regulated d.c. voltage converter. Here an electronic switch in combination with a transformer, secondary rectification and a filter circuit, and together with a magnetic store and a charging capacitor facilitates physically separate transmisson with low losses. When such a switching power supply unit is used with a switching frequency of, e.g., 30 kHz, in the data viewing device although no beat occurs in the characters, the position of the characters on the screen is altered by magnetic fields picked up from the switching power supply unit and the characters quiver about their prescribed positions as soon as the image frequency is asynchronous to the switching frequency of the switching power supply unit. In addition, the fact that the magnetic fields are picked up causes the electron beam to be modulated in its intensity, and the characters on the screen change in brightness so that a flickering of the characters occurs.

SUMMARY OF THE INVENTION

Therefore, an object of the invention is to provide a power supply unit for a data viewing device, in the use of which neither the brightness of the characters nor the position of the characters are subject to a change caused by magnetic fields produced by the power supply unit.

In accordance with the invention, this is achieved in a power supply unit of the type generally described in the introduction in that the control input of the oscillator is connected via a separator stage to the pulse generator of the data viewing device, and by having the repetition frequency of the signals emitted by the oscillator synchronized, via this control input, with the repetition frequency of the timing pulses emitted by the pulse generator.

The power supply unit in accordance with the present invention, has the advantages that there is no necessity to screen the cathode ray tube and/or the power supply unit in the data viewing device, and the outlay for filter elements on the secondary side of the power supply unit is reduced, as the image frequency is synchronous to the switching frequency of the power supply unit. The data viewing device can thus be produced at a favorable cost. The synchronism of the image frequency and of the switching frequency results in a very sharply defined, flicker-free image for the observer.

If the oscillator contains an amplifier provided with a positive feedback and a negative feedback, the synchronization is achieved in a particularly simple manner if the control input of the oscillator is connected to the non-inverting input of the amplifier.

In order to ensure that in the absence of timing pulses, the fundamental frequency of the oscillator is not influenced by the parallel connection of resistors to the non-inverting input of the amplifier, it is advantageous for the control input to be connected to the non-inverting input of the amplifier via a capacitor.

BRIEF DESCRIPTION OF THE DRAWINGS

In the following, an exemplary embodiment of the power supply unit in accordance with the invention will be described making reference to drawings, in which.

DESCRIPTION OF THE PREFERRED EMBODIMENTS

Figure 1:
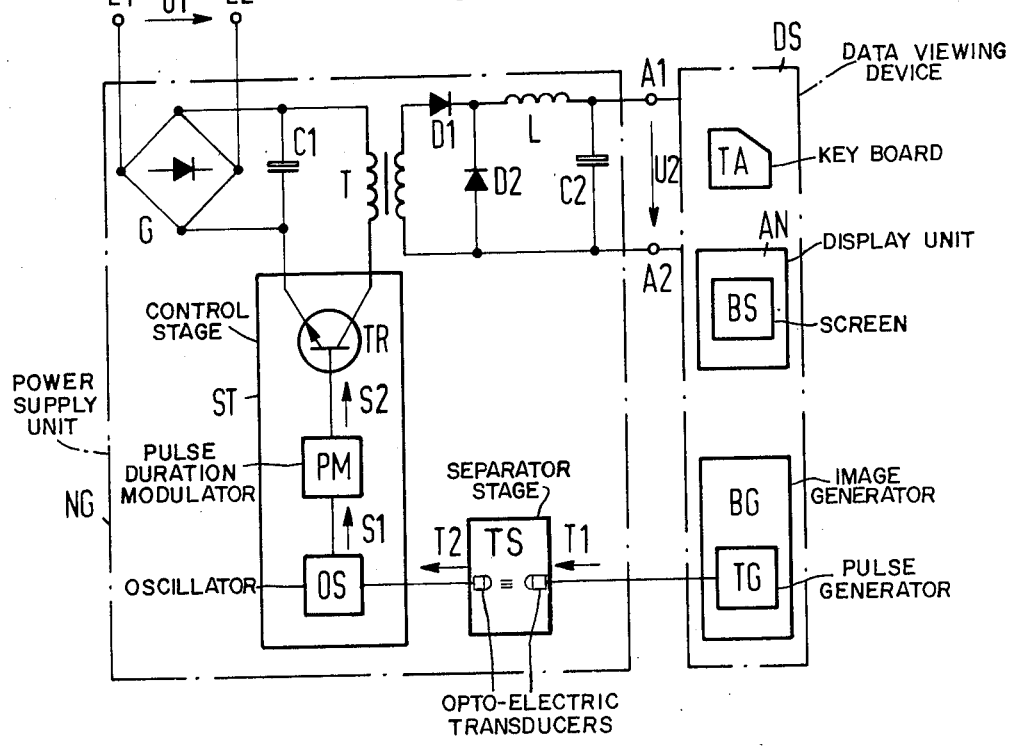
FIG. 1 is a block circuit diagram of a power supply unit for a data viewing device.

The power supply unit NG, illustrated in FIG. 1, is constructed in the form of a switching power supply unit operating in accordance with a known single pulse train flow converter principle. At input terminals E1 and E2, the power supply unit is supplied with an alternating voltage U1 of, e.g., 220 V. At output terminals A1 and A2, the power supply unit produces a d.c. voltage U2 which is required for the operation of the data viewing device DS. It is possible to produce a plurality of d.c. voltages with the aid of the power supply unit NG. For reasons of clarity in FIG. 1, however, only the production of one single d.c. voltage is shown.

The alternating voltage U1 is first conducted to a rectifier G, which produces a d.c. voltage. This d.c. voltage is smoothed by means of a capacitor C1.

The control stage ST arranged at the primary end contains a switching transistor TR, which, under the control of a pulse duration modulator PM, periodically connects the primary winding of the transformer T to the d.c. voltage of the capacitor C1. A current hereby flows both in the primary winding and in the secondary winding of the transformer T. The modulator PM is controlled by an oscillator OS which determines the switching frequency of the power supply unit NG. The voltage across the secondary winding of the transformer T is rectified by a diode D1 and is conducted to a mean-value-forming filter element which consists of a choke L and a capacitor C2. During the period of time in which the transistor TR is blocked in the control stage ST, via a diode D2, referred to as free-running diode, the choke L maintains the current flow until the reconnection of the transistor TR.

If a plurality of d.c. voltages are to be produced by the power supply unit, it is not possible to individually cover all the output circuits with one single regulating amplifier. Therefore, the transformer T is provided with a further winding (not shown) with the aid of which an auxiliary d.c. voltage is produced across a constant load resistor. Via a voltage divider, this auxiliary d.c. voltage is compared, as actual voltage, with a theoretical voltage. In dependence upon the difference between the actual voltage and the theoretical voltage, there is a change in the keying degree, i.e., the ratio of the time in which the transistor TR is switched on to the period duration assigned to the switching frequency of the transistor TR.

The oscillator OS produces binary signals S1 which are conducted to the modulator PM where they serve to convert the actual voltage into pulse-duration-modulated signals S2. The conversion is effected, for example, in that the signals S1 limit the time duration of a saw-tooth-shaped signal whose repetition frequency is thus equal to that of the signal S1. A comparator compares the actual voltage with the voltage of the saw-tooth-shaped signal. When the voltage of the saw-tooth-shaped signal is greater than the actual voltage, a signal S2 is emitted. The duration of the signals S2 and thus the degree of keying are dependent upon the value of the actual voltage. The signals S2 are conducted to the transistor TR and alternately switch the latter on and off.

The d.c. voltage U2, and likewise any further d.c. voltages are conducted to the data viewing device DS. The latter contains a key-board TA, a display unit AN provided with a screen BS and a control unit. Of the control unit, only the image generator BG has been shown which processes code signals stored in an image repetition store from which, by means of a character shape store, it produces digital values for the guidance of an electron beam on the screen BS of the display unit AN.

The control unit contains a pulse generator TG which, under the control of a quartz crystal, produces signals for the construction of an image on the screen. The pulse generator TG also contains a frequency divider which from these signals produces timing pulses T1 for the synchronization of the power supply unit NG.

Having been physically separated via a separator stage TS, the timing pulses are separately transmitted from the data viewing device DS to the oscillator OS at the primary side of the power supply unit. This separator stage TS consists, for example, of an optical coupling element, including transducers, or a transformer. The separator stage TS emits, from its output, timing pulses T2 which are conducted to the control stage ST for the synchronization of the oscillator OS.

Figure 2:
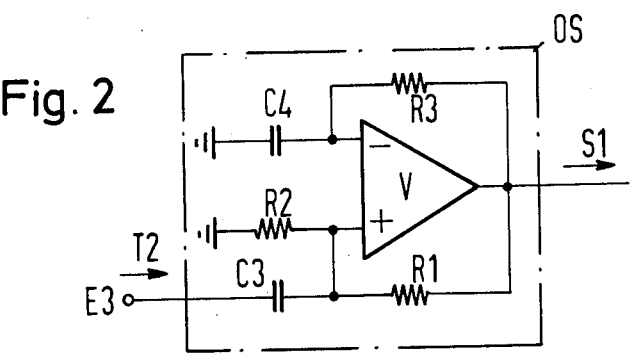
FIG. 2 is a circuit diagram of an oscillator for the power supply unit.

The oscillator OS, illustrated in FIG. 2, of the control stage ST, emits from its output the signals S1 whose repetition frequency can be varied with the aid of the timing pulses T2. The oscillator OS consists of a known, astable multivibrator and a capacitor C3 provided to synchronize the astable multivibrator. The astable multivibrator consists of an operational amplifier V, three resistors R1 to R3 and a capacitor C4. When the signal S1 at the output of the amplifier V possesses a positive amplitude, a positive voltage is connected via a voltage divider composed of the resistors R1 and R2 to the non-inverting input of the amplifier V. At the same time, the capacitor C4 is charged via the resistor R3. When the voltage across the capacitor C4 is greater than that across the resistor R2, the signal S1 assumes a negative amplitude. Thus, a negative voltage is applied via the voltage divider R1, R2 to the non-inverting input. At the same time, the capacitor C4 is discharged via the resistor R3. When the voltage across the capacitor C4 is more negative than that across the resistor R2, the signal S1 reassumes a positive amplitude and the process is repeated afresh. Thus, the signal S1 periodically changes its binary value. Further details of this astable multivibrator are given, for example, in the book "Integrierte Analogschaltungen," Franickh'sche Publishing Company, 1970.

A timing pulse T2 applied via the capacitor C3 to the non-inverting input of the amplifier serves to synchronize the signals S1 as a negative signal S1 is inevitably rendered positive by a positive timing pulse T2. Basically, it is also possible to conduct the timing pulses T2 to the non-inverting input of the amplifier via a resistor. In this case, however, the fundamental frequency of the oscillator is changed, due to the parallel connection of resistors to the resistor R2.

The fundamental frequency of the astable multivibrator is set to be such that it is somewhat lower than the repetition frequency of the timing pulses T2. For example, the fundamental frequency is set at 30 kHz, when the timing pulses T2 possess a repetition frequency of 31.6 kHz.

When the power supply unit is switched on, provided the d.c. voltage is not yet present across the data viewing device, the signals S1 possess the fundamental frequency. When the d.c. voltage is present, and the pulse generator in the image generator emits timing pulses T1, the oscillator OS is synchronized by the timing pulses T2.

It will be apparent to those skilled in the art that many modifications and variations may be effected without departing from the spirit and scope of the novel concepts of the present invention.

We claim as our invention:

1. In a power supply unit for a data viewing device, which, from an alternating voltage source, at least one d.c. voltage is produced for the operation of the data viewing device, where the power supply unit is in the form of a switching power supply unit, and contains an oscillator which is provided with a control input and which produces signals which determine the switching frequency of the switching power supply unit, and in which the data viewing device contains a pulse generator which, in order to construct an image on a screen of the data viewing device, produces timing pulses of a given repetition frequency and a given duration, the construction which includes connecting the control input of said oscillator through a separator stage to said pulse generator of said data viewing device, the repetition frequency of the signals emitted from the oscillator being synchronized by said pulse generator, with the repetition frequency of the timing pulses emitted from said pulse generator, the oscillator containing an amplifier provided with positive feedback and negative feedback, the control input of the oscillator being connected to the non-inverting input of said amplifier.

2. In a power supply unit for a data viewing device, which, from an alternating voltage source, at least one d.c. voltage is produced for the operation of the data viewing device, where the power supply unit is in the form of a switching power supply unit, and contains an oscillator which is provided with a control input and which produces signals which determine the switching frequency of the switching power supply unit, and in which the data viewing device contains a pulse generator which, in order to construct an image on a screen of the data viewing device, produces timing pulses of a given repetition frequency and a given duration, the construction which includes connecting the control input of said oscillator through a separator stage to said pulse generator of said data viewing device, the repetition frequency of the signals emitted from the oscillator being synchronized by said pulse generator, with the repetition frequency of the timing pulses emitted from said pulse generator, the oscillator containing an amplifier provided with positive feedback and negative feedback, the control input of the oscillator being connected to the non-inverting input of said amplifier, the control input to said oscillator being connected to the non-inverting input of the amplifier via a capacitor.

3. In a data viewing device which, from an alternating voltage source, at least one d.c. voltage is produced for the operation of a data viewing device, a switching power supply unit comprising a rectifier connected to said voltage source, a switching transistor, a transformer whose primary is connected through the collector-emitter of said transistor to said rectifier, one side of the secondary of said transformer being first connected through a diode and then through an inductance element to an output terminal of said power supply unit, a second diode connected to the other side of said secondary and to a point between said first diode and said inductance element, the other side of said secondary being connected to the other output terminal of said power supply unit, a free-running oscillator, a pulse generator for providing timing pulses to synchronize the frequency of said oscillator, said pulses being of a predetermined repetition frequency and a given duration, a pulse duration modulator, said oscillator being connected to said pulse duration modulator, the output of said pulse duration modulator being connected to the base of said switching transistor for controlling the on-off condition of said transistor, said separator stage including an optical coupling.

* * * * *